UNITED STATES PATENT OFFICE.

LUDWIG OTTO HELMERS, OF HAMBURG, GERMANY, ASSIGNOR TO ICHTHYOL GESELLSCHAFT, CORDES, HERMANNI & CO., OF SAME PLACE.

TASTELESS COMPOUND FROM SULFURETED HYDROCARBONS AND PROCESS OF MAKING SAME.

SPECIFICATION forming part of Letters Patent No. 624,027, dated May 2, 1899.

Application filed February 23, 1898. Serial No. 671,369. (Specimens.)

*To all whom it may concern:*

Be it known that I, LUDWIG OTTO HELMERS, doctor of philosophy, a subject of the German Emperor, residing at Hamburg, in the German Empire, have invented certain new and useful Improvements in the Production of Earth-Alkali Salts and Metallic Salts, of which the following is a specification.

The ammonium, sodium, and lithium compounds of the product obtained by the action of sulphuric acid upon Seefeld mineral oil and known under the name of "ichthyol," heretofore employed in therapeutics, represent substances soluble in water and having a very intense and peculiar taste. If the sulphonic acid of the ichthyol serving as the initial product of these compounds be neutralized with lime, (calcium carbonate,) magnesia, (magnesium carbonate,) or a metallic oxide or carbonate instead of employing ammonia, soda, or lithium carbonate, then the corresponding ichthyol compounds of the alkaline earths or of the metals, respectively, are obtained. These compounds are entirely insoluble in water, and therefore may also be obtained by alternate decomposition of solutions of ichthyol-alkalies with soluble salts of the alkaline earths or of the metals. After drying at a temperature of 100° centigrade these ichthyol-salts admit of being pulverized and then form a brown-black non-hygroscopic powder, which is insoluble in water as well as in solutions of organic acids. On the other hand, it readily dissolves in chloroform. When heated with mineral acids, the base again splits off and ichthyol sulphonic acid is reformed. Also by heating with caustic alkalies or carbonic alkalies the salts become decomposed. The ichthyol-alkaline salt, which is dissolved, and the oxid or carbonate, respectively, of the base of the ichthyol-salt employed are formed. In spite of their being insoluble in water these ichthyol compounds yet possess rather a strong taste even after having been most carefully washed with water. Experiments have shown that the taste is due to the existence of peculiar substances, of which a small quantity remains mixed with the salts, properly speaking. In order to remove these substances, a great many methods have been employed. As already mentioned, the method of washing the product with water does not, however, lead to the desired result. It is true that on boiling the product for some considerable time with water small quantities of substances of an extremely bitter taste pass out of the insoluble salts into the aqueous solution; but the residue does not thereby lose any of its taste. On the contrary, it has been found that by a continued heating with water a decomposition takes place and that the substances of bitter taste absorbed by the water are products split from the ichthyol. It was then attempted to remove the substances producing the bitter taste by employing other extracting agents. Whereas alcohol has the effect of separating the soluble ichthyol-salts into the ichthyolsulphonic-acid-salts proper, which are soluble in alcohol, and into the sulphone-like compounds, which are insoluble in water and alcohol, (see United States Letters Patent No. 525,784,) the ichthyol salts—that is to say, ichthyol-calcium, magnesium, &c.—which are insoluble in water, dissolve with difficulty even in alcohol. On the other hand, however, those substances which cause the bitter taste very readily dissolve in alcohol, and it is owing to this fact that by properly extracting the dried alkaline earthy and metallic salts with alcohol these compounds can be obtained in an entirely tasteless state. Other solvents—such as methyl alcohol, ether, and acetic ether—behave in a similar manner like alcohol. Like the ichthyol-salts also behave the corresponding salts of sulfonic-acid compounds derived from sulfureted hydrocarbons combined with sulfuric acid.

The following examples may serve for illustrating the process:

*a.* One kilogram of ichthyol sulfonic acid, such as obtained by the action of concentrated sulfuric acid or its substitutes upon Seefeld mineral oil, is dissolved in about ten liters of water, and the solution while being stirred is gradually neutralized by means of chalk. Carbonic acid is set free during this operation and ichthyol calcium is formed, which deposits upon the bottom of the vessel. The water standing above the deposit is decanted after some time has lapsed. In order to separate the ichthyol-calcium from the calcium sulfate and excess of calcium carbonate, the said ichthyol-calcium is dissolved in chloroform and the chloroform subsequently filtered and removed by distillation. The residue is then reduced to powder and extracted in a suitable apparatus by means of alcohol. By the action of the alcohol the substances causing the peculiar taste are dissolved, while the ichthyol-calcium, about one-quarter of a kilogram in weight, remains undissolved in form of a tasteless powder.

b. One kilogram of ichthyol-ammonium as brought into the market dissolved in twenty liters of water is mixed while stirring with three liters of a magnesium-chlorid solution of ten per cent. and the mixture then left untouched for twelve hours. After this period has elapsed a compact precipitate of ichthyol-magnesium has been separated upon the bottom of the vessel. The liquid standing above this precipitate is decanted, the latter being washed repeatedly with water, then first dried at a temperature of 100° centigrade, powdered, and extracted by means of ether. The residue forms a tasteless powder consisting of ichthyol-magnesium.

Having fully described my invention, what I claim, and desire to secure by Letters Patent, is—

1. The process of rendering tasteless sulfonic-acid salts of alkaline earthy metals and metals proper derived from sulfureted hydrocarbons combined with sulfuric acid by extracting the salts with a solvent adapted to dissolve only the bitter substances, substantially as set forth.

2. As a new product of manufacture the herein-described neutral salts, consisting of an alkaline earthy and metallic base and a sulfonic-acid compound derived from sulfureted hydrocarbons combined with sulfuric acid, which salts are of a pulverulent form, insoluble in water and devoid of taste and smell.

In testimony that I claim the foregoing as my invention I have signed my name, in presence of two witnesses, this 5th day of February, 1898.

LUDWIG OTTO HELMERS.

Witnesses:
ALEXANDER SPECHT,
E. HH. MIMMENHOFF.